Jan. 1, 1946. W. J. BRUHN ET AL 2,392,220
STOVE PIPE ELBOW
Filed June 26, 1943 2 Sheets-Sheet 1
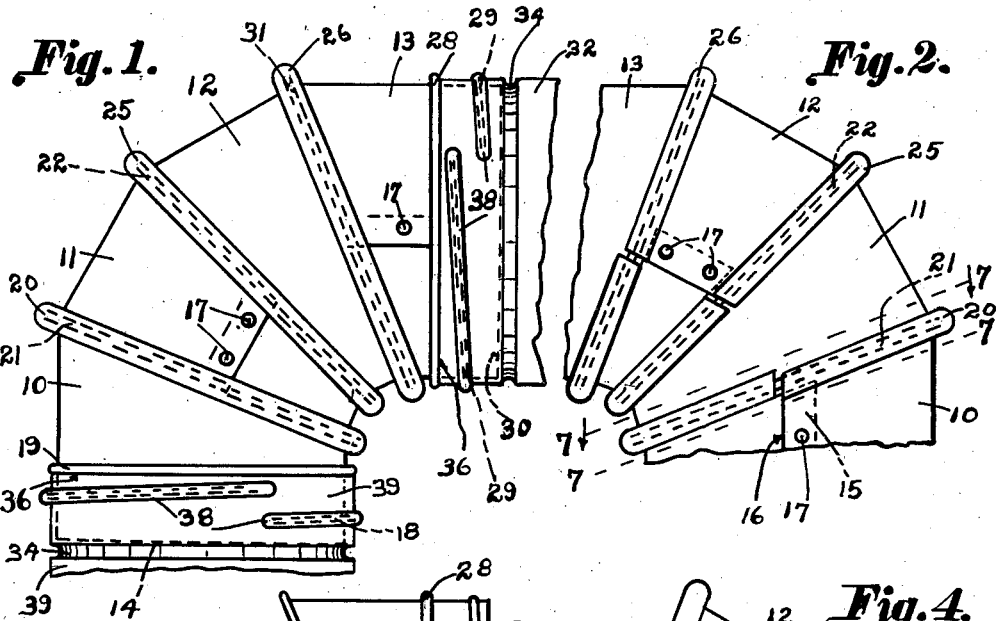
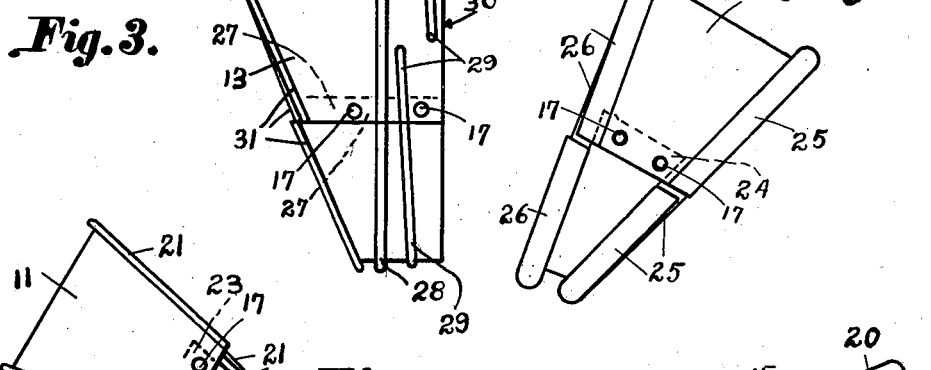
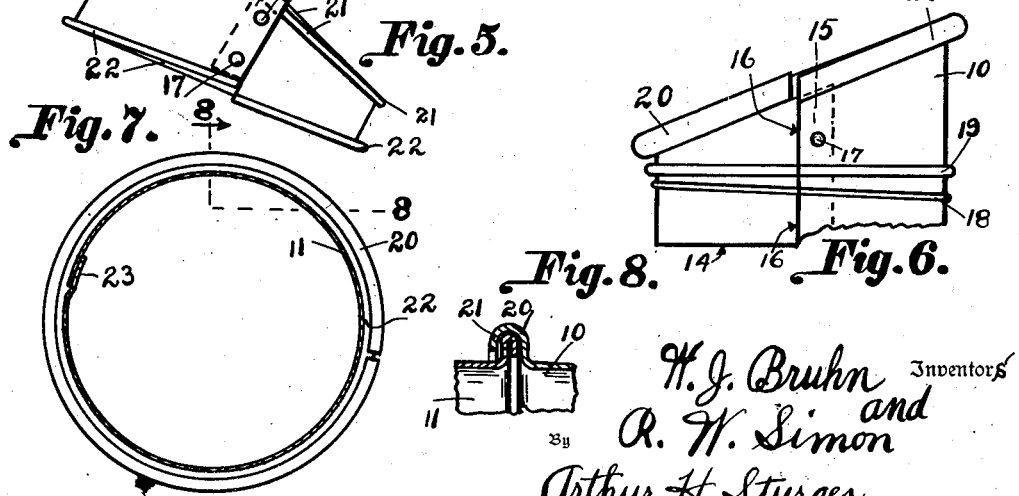
W. J. Bruhn
R. W. Simon Inventors
By Arthur H. Sturges Attorney Jan. 1, 1946.  W. J. BRUHN ET AL  2,392,220
STOVE PIPE ELBOW
Filed June 26, 1943  2 Sheets-Sheet 2

W. J. Bruhn
R. W. Simon  Inventors
and
By Arthur H. Sturges
Attorney

Patented Jan. 1, 1946

2,392,220

UNITED STATES PATENT OFFICE 2,392,220

STOVEPIPE ELBOW

William J. Bruhn and Richard W. Simon, Omaha, Nebr.

Application June 26, 1943, Serial No. 492,404

2 Claims. (Cl. 285—211)

The present invention relates to conduit and elbows, more particularly to tubular sections thereof which are adapted to be joined together end to end for providing a continuous conduit having an elbow.

It is an object of the invention to provide a new article of manufacture comprising a tubular elbow formed preferably of processed sheet metal, the parts of which are so constructed and arranged that said article may be readily and threadedly attached one one or more tubular conduit sections such as or similar to that article depicted and described in our co-pending application for patent, Serial No. 477,356, filed in the United States Patent Office February 27, 1943.

It is also an object of the invention to provide elbow pieces which may be nested compactly one about another and joined together in a package at a centralized factory for transportation and distribution to ultimate users, and to provide means on said pieces such that an unskilled user may readily form said pieces into accurate finished elbow sections and an elbow.

Another object of the invention is to provide elbow sections so constructed that they may be readily adjusted to form any desired degree of bend to the right or left of a conduit, said construction being such that the joints thereof are tight for preventing gas leaks therethrough when adjusted to a position of use.

Still another object of the invention is to provide elbow pieces with holes for receiving rivets therethrough, said holes being disposed adjacent the ends of each section so that at the time a user disposes rivets through aligned holes and said rivets are peened, true elbow sections are provided by said pieces of pre-selected size and diameter; whereby one elbow section will accurately fit and can be readily joined to a next adjacent section.

A further object of the invention is to provide a construction having means for joining the sections together readily whereby a pulling apart of the sections is prevented, and also a pulling apart of end sections with respect to straight conduit sections, and substantially airtight joints are provided.

A further object of the invention is to provide an elbow for the above described purposes having annular detents or stops on the end sections thereof for engagement with the annular ends of straight tubular conduit sections for providing airtight joints at the time said ends and stops are abutted together.

A still further object of the invention is to provide straight conduit sections having annular stops arranged to abut and engage with the annular ends of the outer ends of the end sections of the elbow of the present invention for providing airtight joints.

Other and further objects and advantages of the invention will be obvious to those skilled in the art.

In the drawings:

Figure 1 is a side view of the new elbow having a broken away straight pipe sections secured to each end thereof.

Figure 2 is a side view of the reverse side of the elbow shown in Figure 1, certain portions of the ends of said elbow being broken away.

Figure 3 is a side view of an end section of the elbow shown in Figure 1.

Figure 4 is a side view, as shown in Figure 2, of an elbow section provided with female threads.

Figure 5 is a side view, as shown in Figure 1, of an elbow section provided with male threads.

Figure 6 is a side view, as shown in Figure 2, of the other end section of the elbow of the present invention, a certain portion thereof being broken away.

Figure 7 is a transverse section taken between the lines 7—7 of Figure 2.

Figure 8 is a longitudinal section of a fragment of the elbow, the view being taken along the line 8—8 of Figure 7.

Figure 9:
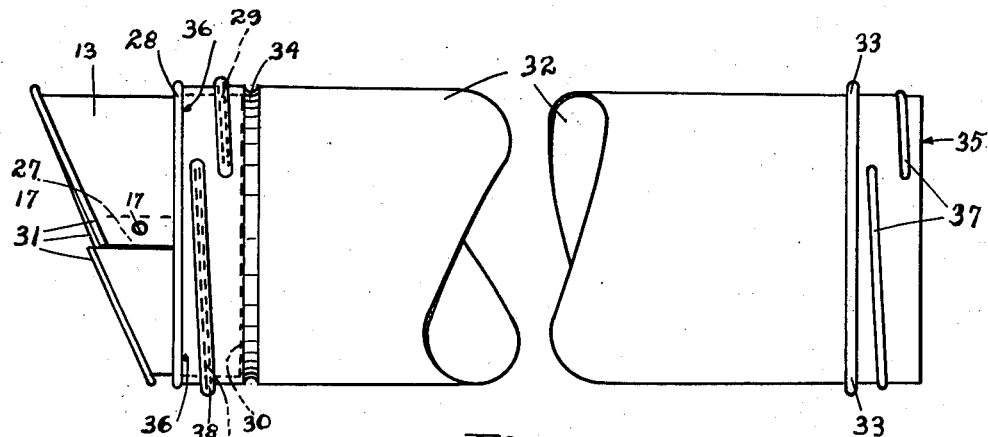
Figure 9 is a side view of a straight pipe section having a portion intermediate its ends broken away and showing an end section of the elbow joined thereto.

It is well known to the sheet metal art that partially fabricated sheet metal goods, if nested together in a package, are entitled to and receive a much lower freight rate than in instances where an article is completely assembled, and the present invention therefore aims to provide elbow pieces which are so constructed that they may be packaged together in a compact manner, utilizing pre-formed rivet holes for said purpose, and to also obviate certain other undesirable features of the prior practice.

The elbow of the present invention includes a plurality of sections, and as specifically illustrated in Figure 1 the elbow includes four sections, respectively indicated at 10, 11, 12 and 13, each being formed of an integral piece of material. As best shown in Figure 6, the section 10 is provided with an annular end 14 disposed at a true right angle with respect to the axis thereof. The section 10 is rolled or bent to a substantially circular configuration in end elevation and provided with a tongue 15 which underlaps the edge 16 thereof, whereby at times when rivets 17 are disposed through pre-formed holes and peened the section 10 is tubular.

An annular helical male thread 18 is formed in the piece 10 by a suitable punch press operation, such as or similar to the operation described in our said co-pending application, and an outstanding detent rib 19 is similarly provided, said rib being disposed at a true right angle with respect to the longitudinal length or axis of the section and parallel to the edge 14. The end of the section 10 opposite its end edge 14 is provided with a female thread 20, as shown in Figure 8.

The section 11, as shown in Figure 5, is provided with offset oppositely disposed male threads 21 and 22 at its ends. As best shown in Figure 8, the threads 21 and 22 are bent upon themselves for providing seamed threads whereby the perimeters thereof are smooth and strong, for purposes later described, said thread 21 being received into the female thread 20 of the section 10 during use. The section 11 is provided with an underlapping tab portion 23, whereby further rivets 17 may be employed for providing a section which is of true circular contour in end elevation.

The section 12 is similarly provided with further rivets 17 for securing its tab 24 for providing a circular section and is provided with oppositely disposed female threads 25 and 26 at its ends. In use, the male thread 22 of the section 11 is received within the female thread 25 of the section 12.

The section 13 is also provided with a tab portion 27 and further rivets 17 for joining adjacent ends thereof together in a true circular configuration. The end section 13 is similarly provided with an outstanding annular detent or rib 28 and a helically disposed male thread 29 between its smooth end 30 and the detent 28. The other end of the section 13 is provided with a helical male thread 31 which is similar to the threads 22 and 21 of the section 11.

Referring to Figure 9, a straight pipe section 32 of the present invention is provided adjacent one end thereof with an outstanding rib or lug detent 33, and a similar but inwardly disposed detent 34 adjacent its opposite end. The straight pipe section 32 may be of any desired length having opposite plain ends 35 and 36 which are disposed at a true right angle with respect to the length thereof. Between the end 35 and the detent 33 a helical outstanding male thread 37 is provided. Between the detent 34 and the end 36 a helical female thread 38 is provided. One end of the pipe 32 is of slightly less diameter than its other end, whereby its end 36 is adapted to receive, threadedly, the small end of another and similar straight pipe section, the thread 38 of said other section engaging the thread 37 of the section 32, for providing a conduit of a desired length.

As shown in Figure 9, the section 13 of the elbow is joined to the straight pipe 32 by means of rotating the male thread 29 of the elbow section 13 into and in engagement with the female thread 38 of the section 32 until the end 36 of the section 32 becomes abutted against the annular detent 28 of the elbow section 13 and until the plain end 30 of the section 13 becomes abutted against the inwardly disposed detent 34 of the section 32 for joining the pipe section 32 and the end elbow section 13 together in a manner whereby an airtight joint is provided.

As shown in Figure 1, the end section 10 of the elbow is similarly joined, for said purposes, to the wider end of a further straight pipe section 39 for providing a conduit having an elbow. The straight pipe sections 32 and 39 may be nested together for compact shipment as described in our said copending application.

Figures 10, 11:
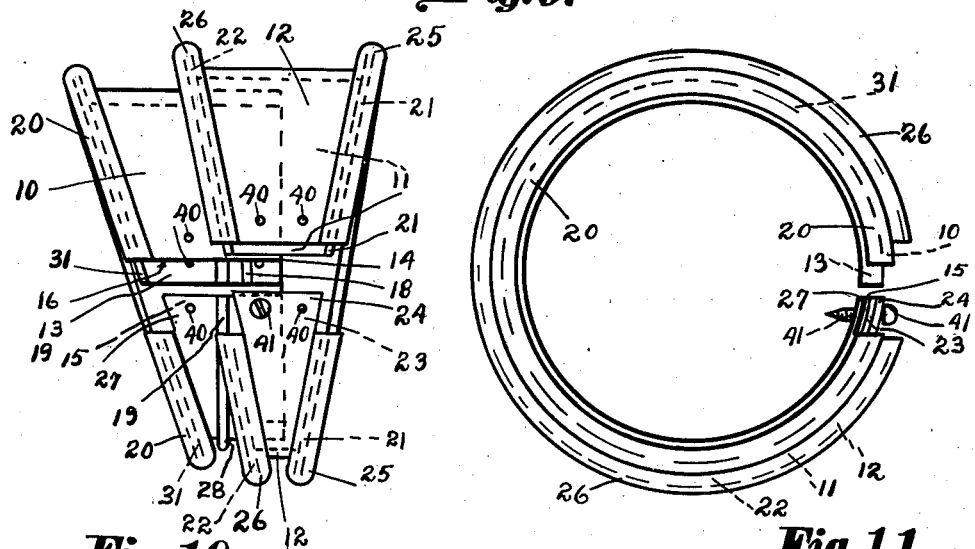
Figure 10 is a side view of the pieces of the elbow of the present invention nested in a package prior to being formed into elbow sections.
Figure 11 is an end view of the package of pieces shown in Figure 10.

The package of the elbow pieces of the present invention is illustrated in Figures 10 and 11. As shown in Figure 10, it will be understood that the tab portions and adjacent end portions of the elbow pieces are each provided with a plurality of rivet holes 40 for receiving the rivets 17 for providing elbow sections as above described. Since the rivet holes are all disposed accurately in a pre-selected position certain holes of the pieces, and particularly the holes of the tab portions thereof, may be readily aligned as shown in Figures 11 and 12. To provide the package of the present invention the end elbow section 13 is disposed within the end elbow section 10 in a manner whereby the male thread 31 of the section 13 is disposed within the female thread 20 of the section 13 and thereby protected during shipment. Similarly, the section 11 is disposed within the section 12 in a manner whereby the male thread 22 is nested within the female thread 26 of the section 12, and the male thread 21 of the section 11 is similarly nested within the thread 25 of the section 12, whereupon the section 11 is placed about the section 10. At this time the tabs of the elbow sections are substantially aligned by an operator, as shown in Figure 10, and rivet holes of the tabs of the sections are then disposed in alignment with each other for receiving a suitable keeper therethrough. Preferably, the keeper is provided by means of a screw 41 disposed through the aligned holes of the elbow sections, as best shown in Figure 11, the threads of the screw 41 engaging the walls of the aligned holes 40 for providing the package of elbow pieces held together for shipment in a manner whereby the weaker portions thereof, namely, the male threads 21, 22 and 31, are protected; this being desirable, since the male threads are maintained smooth for facilitating a joining of the elbow sections together, as above described.

In operation, the package of elbow pieces being assembled for shipment at a factory, upon arrival in the hands of an ultimate user he may readily remove the keeper 41 and disenagage the pieces 10, 11, 12 and 13 from one another, whereupon he applies the rivets 17 to the rivet holes 40 of the respective pieces for providing elbow sections. Since the rivet holes are accurately formed at the factory in such position that at the time the end tabs of the pieces are disposed under adjacent longitudinal ends of the sections, the holes of said end tabs and ends align accurately for receiving the rivets through said aligned holes and in this manner elbow sections thereby become formed of a pre-selected size and true shape, whereby they may be readily attached one to another for providing an elbow.

The keeper 41 may be omitted in instances where the elbow pieces are properly nested together, as above described, since the interfitting threads of the pieces are sufficient for holding the pieces together in a package and in instances where the material of said pieces is of sufficiently stiff gauge to provide a clamping action when one piece is disposed about another.

Among other advantages of the invention it will be noted that the several sections, when attached together as above described, will not pull apart during use as often has happened heretofore when conduits are employed for smoke pipes, and that tight joints are formed whereby noxious gases and the like are confined in the conduit.

At times when the elbow pieces are formed of certain of the modern non-inflammablel plastics or of sheet metal, said material has sufficient inherent resiliency to cause one elbow piece to clamp and grip a next adjacent piece when said pieces are assembled in the above described package, since said resiliency normally urges the free ends of each of the arcuate pieces toward each other.

From the foregoing description it is thought to be obvious that a conduit which includes an elbow constructed in accordance with our invention is particularly well adapted for use by reason of the convenience and facility with which it may be assembled and operated, and it will also be obvious that our invention is susceptible of some change and modification without departing from the principles and spirit thereof.

We claim:

1. In a tubular conduit elbow, a plurality of sections threadedly joined together, and a helical screw thread disposed on the outer end of each of the end sections arranged to engage complemental screw threads of straight tubular sections.

2. A tubular conduit comprising a plurality of elbow sections threadedly joined together for providing an elbow, an annular detent adjacent the end of each end section, said detents each being disposed at a right angle with respect to the axis of and on the perimeter of said end sections, a helical thread provided on each end section between said detents and said ends, and straight sections each having complemental threads for a joinder thereof to respective end sections of the elbow, whereby the ends of the straight sections abut their respective detents.

WILLIAM J. BRUHN.
RICHARD W. SIMON.